United States Patent
Kondo

(10) Patent No.: US 9,442,038 B2
(45) Date of Patent: Sep. 13, 2016

(54) STORAGE APPARATUS, STORAGE APPARATUS MANUFACTURING METHOD, AND MEASUREMENT METHOD OF THE SAME

(71) Applicant: FUJITSU LIMITED, Kawasaki-shi, Kanagawa (JP)

(72) Inventor: Reiko Kondo, Yamato (JP)

(73) Assignee: FUJITSU LIMITED, Kawasaki (JP)

( * ) Notice: Subject to any disclaimer, the term of this patent is extended or adjusted under 35 U.S.C. 154(b) by 71 days.

(21) Appl. No.: 14/615,534

(22) Filed: Feb. 6, 2015

(65) Prior Publication Data
US 2015/0274396 A1 Oct. 1, 2015

(30) Foreign Application Priority Data
Mar. 31, 2014 (JP) ................. 2014-072147

(51) Int. Cl.
G06F 1/16 (2006.01)
G01M 7/02 (2006.01)
G06F 1/18 (2006.01)
G01M 5/00 (2006.01)
G01M 7/00 (2006.01)

(52) U.S. Cl.
CPC ........... *G01M 7/025* (2013.01); *G01M 5/0033* (2013.01); *G01M 5/0066* (2013.01); *G01M 7/00* (2013.01); *G06F 1/187* (2013.01); *Y10T 29/49826* (2015.01)

(58) Field of Classification Search
CPC ........ H05K 5/02; F28D 20/021; G06F 1/187
USPC ....... 248/244, 633, 636, 483, 454, 455, 459, 248/174, 152; 600/5; 361/679.55, 679.34, 361/679.21, 679.26, 679.08, 679.47, 361/679.02, 679.58, 679.31, 679.53, 361/679.52, 679.57, 679.38, 679.37; 165/41, 104.33, 96, 48.1, 254, 10, 165/104.17, 11.1, 104.21, 181, 110; 435/29, 305.2, 6.12, 287.2, 6.1, 307.1, 435/2

See application file for complete search history.

(56) References Cited

U.S. PATENT DOCUMENTS

2005/0240950 A1 10/2005 Preis et al.
2009/0278009 A1* 11/2009 Nono .................. A47B 57/583
248/244
2015/0328446 A1* 11/2015 Kaintz ................ A61M 39/223
600/5

FOREIGN PATENT DOCUMENTS

JP 2004-176887 6/2004
JP 2005-267842 9/2005

OTHER PUBLICATIONS

Patent Abstracts of Japan, Publication No. 2004-176887, published Jun. 24, 2004.
Patent Abstracts of Japan, Publication No. 2005-267842, published Sep. 29, 2005.

\* cited by examiner

*Primary Examiner* — Hung Duong
(74) *Attorney, Agent, or Firm* — Staas & Halsey LLP

(57) ABSTRACT

A storage apparatus including one or plural storage devices installed in a housing, a bag that is internally charged with a fluid and caused to contact the storage device, and an internal pressure regulator that regulates the internal pressure of the bag.

12 Claims, 18 Drawing Sheets exemplary embodiment.

STORAGE APPARATUS, STORAGE APPARATUS MANUFACTURING METHOD, AND MEASUREMENT METHOD OF THE SAME

CROSS-REFERENCE TO RELATED APPLICATION

This application is based upon and claims the benefit of priority of the prior Japanese Patent Application No. 2014-072147, filed on Mar. 31, 2014, the entire contents of which are incorporated herein by reference.

FIELD

The embodiments discussed herein are related to a storage apparatus, a storage apparatus manufacturing method, and a storage apparatus measurement method.

BACKGROUND

A structure exists that includes a housing in which a supporting structure is disposed, serving as a device to hold a storage medium such as a hard disk, with the supporting structure coupled to the housing in a state in which vibrations are attenuated by a vibration damping device.

Moreover, there is a vibration suppression device provided with a function that changes the frequency range where the vibration suppression effects are markedly exhibited by making the mass of a vibration member that moves (vibrates) in the interior space of the housing modifiable.

RELATED PATENT DOCUMENTS

Japanese Laid-Open Patent Publication No.2005-267842
Japanese Laid-Open Patent Publication No.2004-176887

SUMMARY

According to an aspect of the embodiments, a storage apparatus includes one or a plurality of storage devices installed in a housing, a bag that is internally charged with a fluid, and that is caused to contact the storage device, and an internal pressure regulator that regulates the internal pressure of the bag.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Detailed explanation follows regarding a first exemplary embodiment based on the drawings.

Figure 1:
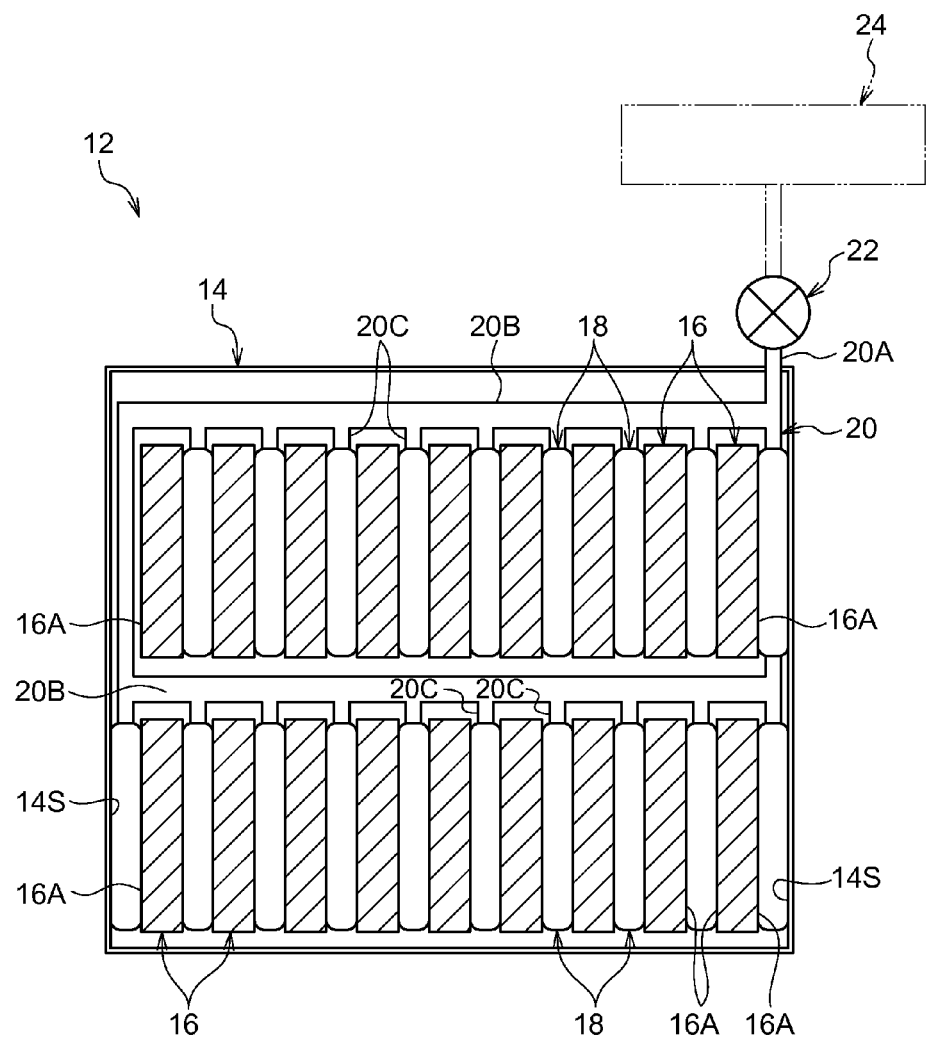
FIG. 1 is a plan view illustrating a storage apparatus of a first exemplary embodiment.
Figure 2:
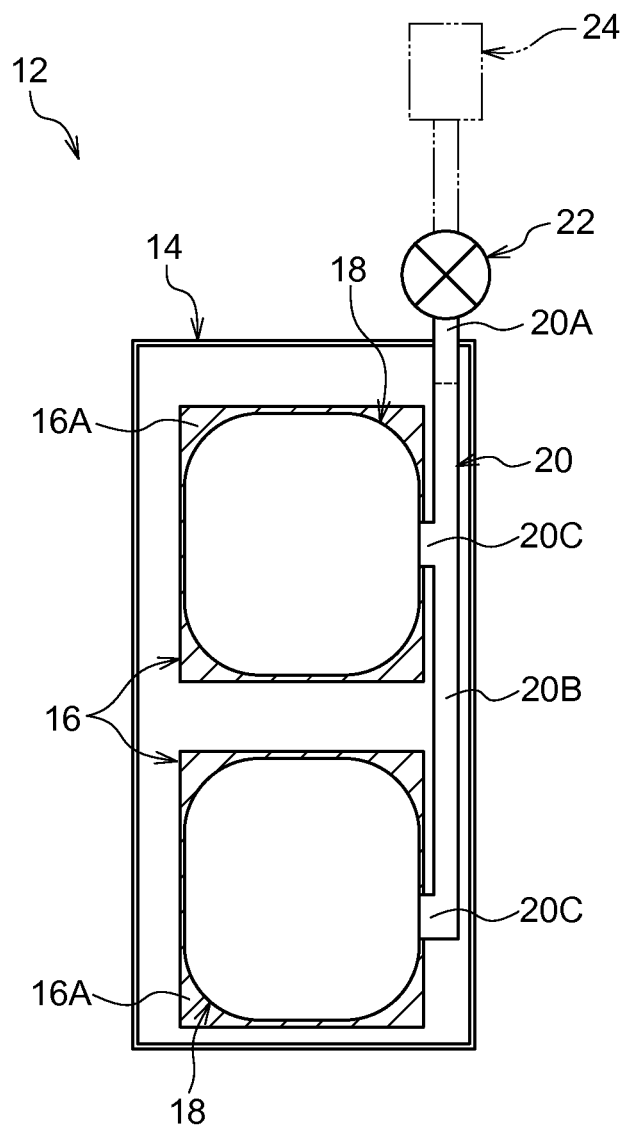
FIG. 2 is a side view illustrating a storage apparatus of the first exemplary embodiment.
Figure 3:
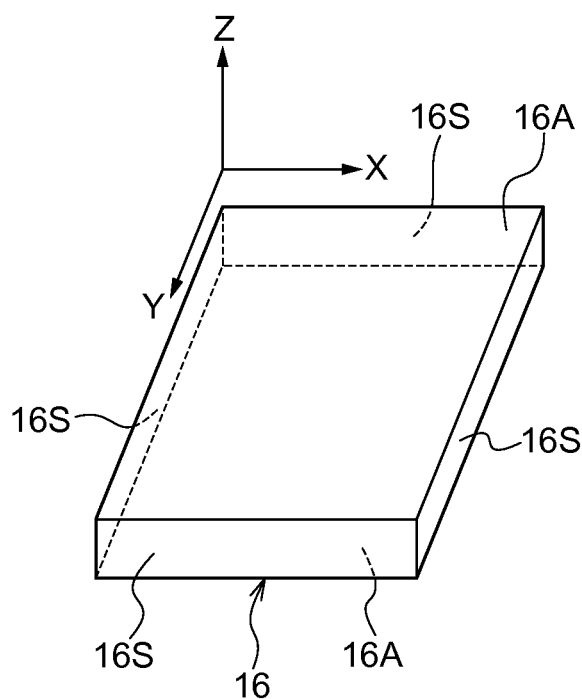
FIG. 3 is a perspective view illustrating a hard disk device.

FIG. 1 and FIG. 2 illustrate a storage apparatus 12 of the first exemplary embodiment. The storage apparatus 12 includes a housing 14, and plural hard disk devices 16 disposed inside the housing 14. As is apparent from FIG. 1 and FIG. 2, the exterior form of the hard disk device 16 is cuboidal in the present exemplary embodiment. The hard disk device 16 includes two widest faces due to the cuboidal shape. As illustrated in FIG. 3, on the widest faces of the hard disk device 16, the width direction is an X direction, the length direction is a Y direction, and the thickness direction is a Z direction. Moreover, the two widest faces are planar surfaces 16A, and the four faces at the periphery in FIG. 3 are side surfaces 16S.

As is apparent from FIG. 1, the plural hard disk devices 16 are arrayed in the housing 14 such that the planar surfaces 16A face one another. In particular, in the example illustrated in FIG. 1, nine units of the hard disk device 16 are disposed in respective rows, and since there are two such rows, a total of 18 units of the hard disk device 16 are disposed in the housing 14. The planar surfaces 16A of the hard disk devices 16 at each end portion in the row direction face toward respective side faces 14S of the housing 14.

Bags 18 are arrayed between mutually opposing planar surfaces 16A, and between the planar surface 16A and the side face 14S of the housing 14. The bags 18 are in contact with either two of the planar surfaces 16A positioned at both sides thereof, or with one of the planar surfaces 16A and one of the side faces 14S. In the example illustrated in FIG. 2, the bags 18 are substantially in contact with the entire area of the planar surfaces 16A.

The plural bags 18 are mutually connected through a pipe 20. Pipe branches 20B that branch out from an inflow pipe 20A, and pipe branches 20C that further branch out for each of the bags 18, are formed in the example of FIG. 1. The pipe branches 20C are connected to each of the bags 18.

A regulating valve 22 is provided at an end portion of the inflow pipe 20A (external to the housing 14 in the example of FIG. 1 and FIG. 2). The regulating valve 22 is an example of an open/close valve, and enables switching of the state of communication between the interior and the exterior of the bags 18.

Figure 19:
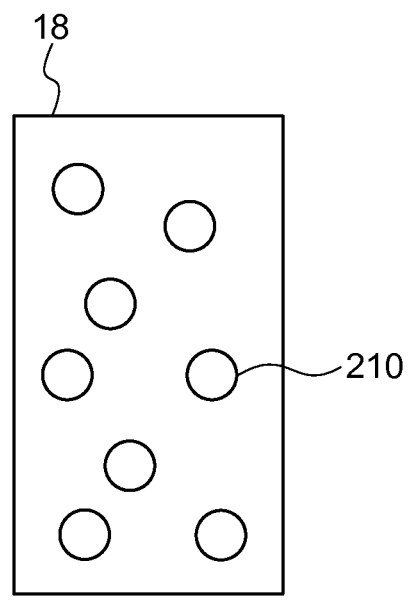
FIG. 19 is a front-face view illustrating an example of an interior structure of a bag.

A fluid is charged into the bags 18. The fluid may be a liquid or a gas, and moreover may be a mixed medium of a liquid and a gas. The mixed medium of a liquid and a gas may, for example, be a structure in which gas bubbles are present in the liquid. The gas bubbles in the liquid may be gas bubbles that were not prevented from entering during a manufacturing process, and may be gas bubbles that were intentionally generated. Moreover, plural vessels 210 charged with gas may be present in the liquid in mixed medium of the liquid and the gas as illustrated in FIG. 19. The amount of fluid in the bags 18 is regulated such that a specific internal pressure is reached for the internal pressure of the bags 18 using a method described below. This regulation is, for example, performed during manufacture of the storage apparatus 12 in the first exemplary embodiment.

During manufacture of the storage apparatus 12, a pressurizer 24 that pressurizes the fluid and injects the fluid into the bag 18 is connected to the pipe 20 through the regulating valve 22, as illustrated by the double dotted intermittent line in FIG. 1.

Figure 4:
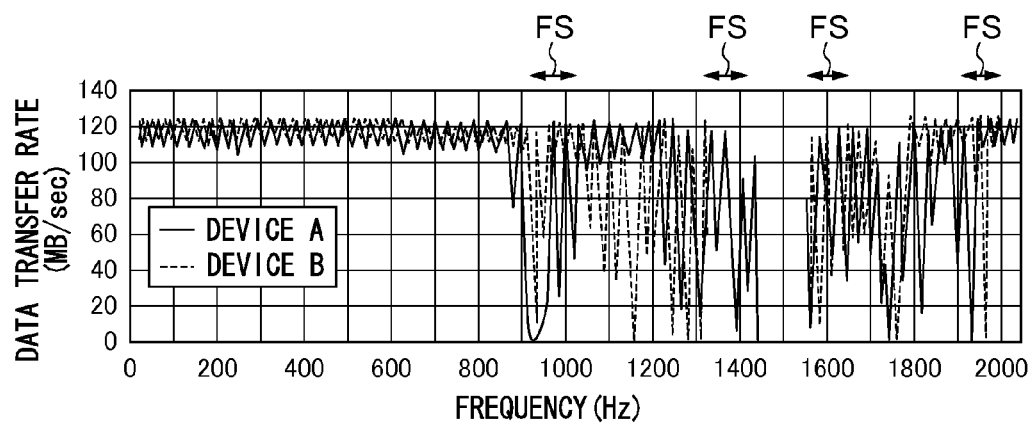
FIG. 4 is a graph illustrating an example of a relationship between the frequency of vibrations in a hard disk device, and a data transfer rate.

A storage apparatus measurement method (referred to simply by "measurement method" hereafter) is then performed. In the measurement method, a vibration test is performed in which a unit of the hard disk device 16 (in a state prior to being disposed in the housing 14) is vibrated over a specific frequency range (for example, up to 2000 Hz). According to test results, the frequency at which performance deteriorates is often 1000 Hz or greater, and so vibrating up to 1000 Hz or greater is therefore preferable. The vibration is performed along each of the three directions, the X direction, the Y direction, and the Z direction, illustrated in FIG. 3. The amplitude of the vibration is set, as an example in the present exemplary embodiment, at from approximately 0.02 G to approximately 0.1 G A data transfer rate of the hard disk device 16 is then measured while the vibration is performed. The data transfer rate is an example of performance of the hard disk device 16. An example of a relationship between the frequency of the vibration applied to the hard disk device 16 and the data transfer rate for two hard disk device units of the same type (distinguished as device A and device B in the graph) is illustrated in FIG. 4. From this graph, deterioration in the data transfer rate of the hard disk device 16 is particularly apparent in specific frequency ranges FS at 900 Hz and above. The above stage is a first measurement stage.

Next, in a state in which the hard disk device 16 has been installed in the housing 14 as illustrated in FIG. 1 and FIG. 2, for example, the housing 14 is vibrated using an impulse hammer or the like, and the resonance frequencies of the hard disk device 16 are measured.

Figure 5:
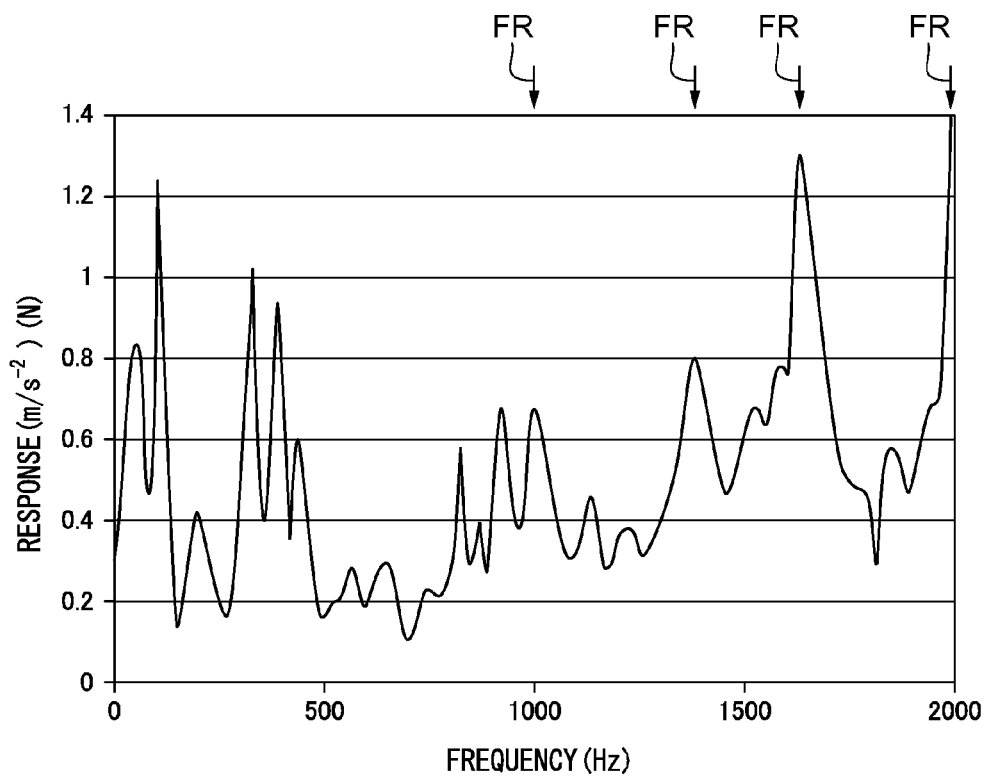
FIG. 5 is a graph illustrating an example of a relationship between the frequency of vibrations in a hard disk device and response.

FIG. 5 illustrates a relationship between frequency and response when the housing 14 is vibrated. The "response" is acceleration of displacement of the hard disk device 16 with respect to the force exerted on the hard disk device 16 during vibration, and larger values thereof indicate a greater tendency to resonate. In particular, from the graph of FIG. 5, specific frequencies at which there is a large response are those where the frequency is a resonance frequency FR. The "resonance frequency" broadly includes frequencies at which the hard disk device 16 installed to the housing 14 vibrates greatly due to external input as described above, excluding so-called "natural frequencies". The above stage is a second measurement stage.

Next, the specific frequency ranges FS where the data transfer rate of the hard disk device 16 deteriorated are compared to the resonance frequencies FR of the hard disk device 16 when installed in the housing 14. This is a comparison stage. In the above example, overlaps between the specific frequency ranges FS and the resonance frequencies FR are apparent from FIG. 4 and FIG. 5 at frequencies of approximately 1000 Hz, approximately 1360 Hz, approximately 1540 Hz, and approximately 1980 Hz.

When a specific frequency range FS and a resonance frequency FR of the hard disk device 16 overlap in this manner, or are near to each other, a large vibration due to external input acts on the hard disk device 16, and this causes deterioration in data transfer rate of the hard disk device 16.

In the present exemplary embodiment, when the specific frequency ranges FS and the resonance frequencies FR of the hard disk device 16 overlap with each other, the internal pressure of the bags 18 is regulated by the pressurizer 24 and the regulating valve 22, and the resonance frequencies FR are shifted away from the specific frequency ranges FS. Specifically, in a state of changed internal pressure of the bags 18, vibration is performed similarly to as in the second measurement stage above, for example using an impulse hammer or the like, and frequencies are measured.

This operation is repeated, and the internal pressure of the bag 18 is regulated such that the resonance frequencies FR of the hard disk devices 16 installed in the housing 14 and the specific frequency ranges FS of the hard disk device 16 do not overlap with each other. Resonance of the hard disk devices 16 installed in the housing 14 is thereby suppressed at the specific frequency ranges FS at which the data transfer rate deteriorates. This thereby enables deterioration of the data transfer rate caused by resonance to be suppressed even when, for example, vibrations at the specific frequency ranges FS have been externally input. Specifically in, for example, a manufacturing plant, since the specific frequencies do not penetrate through, this thereby enables suppression of the issue of specific frequencies penetrating through to the usage environment and causing a deterioration of the data transfer rate of the hard disk device 16, even without lowering the data transfer rate of the hard disk device 16.

The hard disk devices 16 and the bags 18 are disposed in the housing 14 during manufacture of the storage apparatus 12. The hard disk devices 16 are then installed to specific positions in the housing 14 using fixings such as screws or hooks. When this is being done, the fluid has already been charged into the bags 18 in advance, enabling position shift or dislodgment of the bags 18 to be suppressed by the bags 18 pressing against the hard disk device 16 and the housing 14. Then, the pipe 20 is connected to the bags 18.

Next, the pressurizer 24 is connected to the regulating valve 22. The fluid is then charged into the respective bags 18 from the pressurizer 24, through the regulating valve 22. Regulating the amount of fluid charged at this time enables the internal pressure of the bags 18 to be regulated, and the resonance frequencies of the hard disk device 16 to be shifted away from the specific frequencies of the hard disk device 16.

Note that at the stage of installing the bags 18 in the housing 14, the internal pressure of the bags 18 may be regulated by charging an ample amount of fluid, and allowing a specific amount of fluid to flow out from the bags 18.

The regulating valve 22 in the first exemplary embodiment is an example of an internal pressure regulator. The storage apparatus 12 includes the regulating valve 22, thereby enabling easy regulation of the internal pressure of the bags 18 with a simple structure.

In cases in which shipping from a plant or the like occurs after the internal pressure of the bag 18 has been regulated, the regulating valve 22 may be rendered unable to open/close such that regulation of the internal pressure by the regulating valve 22 is not performed. The open/close function of the regulating valve 22 may also be preserved, so as to enable re-regulation of the internal pressure of the bags 18 in the actual usage environment of the storage apparatus 12. Moreover, even once the open/close function of the regulating valve 22 has been rendered non-functional, the regulating valve 22 may be made able to open/close again when performing re-regulation, such as when, for example, the internal pressure in the bags 18 has decreased. When re-regulating the internal pressure of the bag 18, the pressurizer 24 may be reconnected to the regulating valve 22.

The regulating valve 22 may be removed from the storage apparatus 12 after the storage apparatus 12 has been manufactured in a plant or the like, namely after the internal pressure of the bags 18 has been regulated. In such cases, the pipe 20 is made with a sealing member or the like. A simplified structure of the storage apparatus 12 and reduction in weight is achieved by removing the regulating valve 22 from the storage apparatus 12.

In the first exemplary embodiment, the pressurizer 24 for charging the fluid into the bags 18 is a separate member from the storage apparatus 12, enabling a contribution to be made to making the storage apparatus 12 lighter in weight and lower in cost. Moreover, a common pressurizer 24 may be used to manufacture plural storage apparatus 12 in, for example, a manufacturing plant for the storage apparatus 12.

Explanation next follows regarding a second exemplary embodiment. In the second exemplary embodiment components, members, and the like similar to those of the first exemplary embodiment are appended with the same reference numerals, and detailed explanation thereof is omitted.

Figure 6:
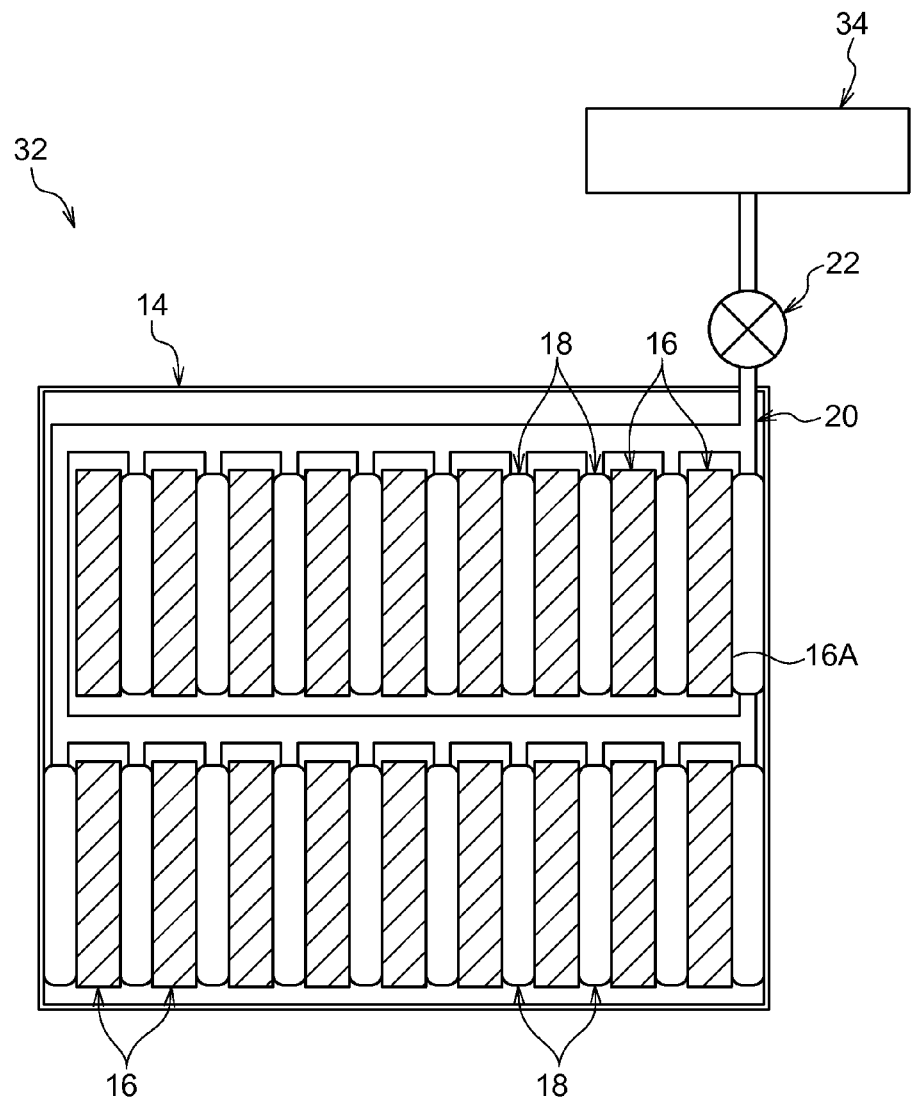
FIG. 6 is a plan view illustrating a storage apparatus of a second exemplary embodiment.
Figure 7:
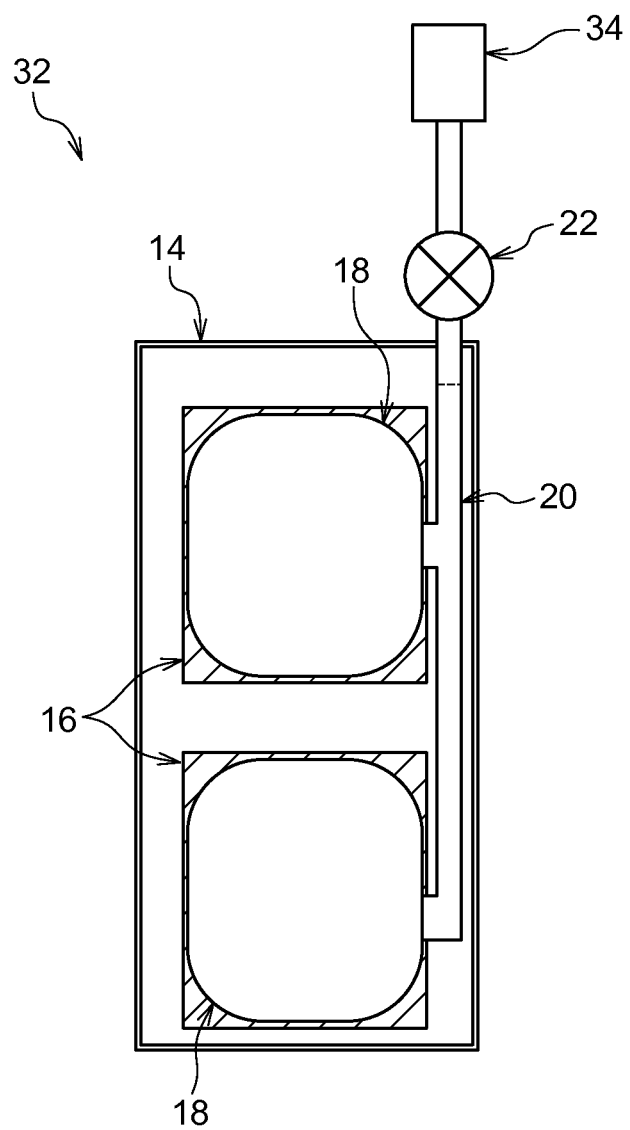
FIG. 7 is a side view illustrating a storage apparatus of the second exemplary embodiment.

As illustrated in FIG. 6 and FIG. 7, a storage apparatus 32 of the second exemplary embodiment includes a pressurizer 34. In the second exemplary embodiment, the regulating valve 22 and the pressurizer 34 are an example of an internal pressure regulator. In the second exemplary embodiment the fluid pressurized by the pressurizer 34 flows into the bags 18 through the regulating valve 22. In the second exemplary embodiment the pressurizer 34 can not only depressurize, but also pressurize, the fluid.

In the second exemplary embodiment, the internal pressure of the bags 18 of the storage apparatus 32 is regulated by the regulating valve 22 during manufacture such that the resonance frequencies FR of the hard disk devices 16 installed in the housing 14 are shifted away from the specific frequency ranges FS. This thereby enables deterioration in data transfer rate in the hard disk devices 16 installed in the housing 14 caused by resonance to be suppressed.

In particular, internal pressure regulation of the bags 18 is possible for each storage apparatus 32 in the second exemplary embodiment, since the storage apparatus 32 includes the pressurizer 34. Moreover, when the storage apparatus 32 includes the pressurizer 34, the amount of fluid charged into the bags 18, namely the internal pressure of the bags 18, is easily re-regulated, for example, during usage of the storage apparatus 32.

Next, explanation follows regarding a third exemplary embodiment. In the third exemplary embodiment, components, members, and the like similar to those of the first exemplary embodiment and the second exemplary embodiment are appended with the same reference numerals, and detailed explanation thereof is omitted.

Figure 8:
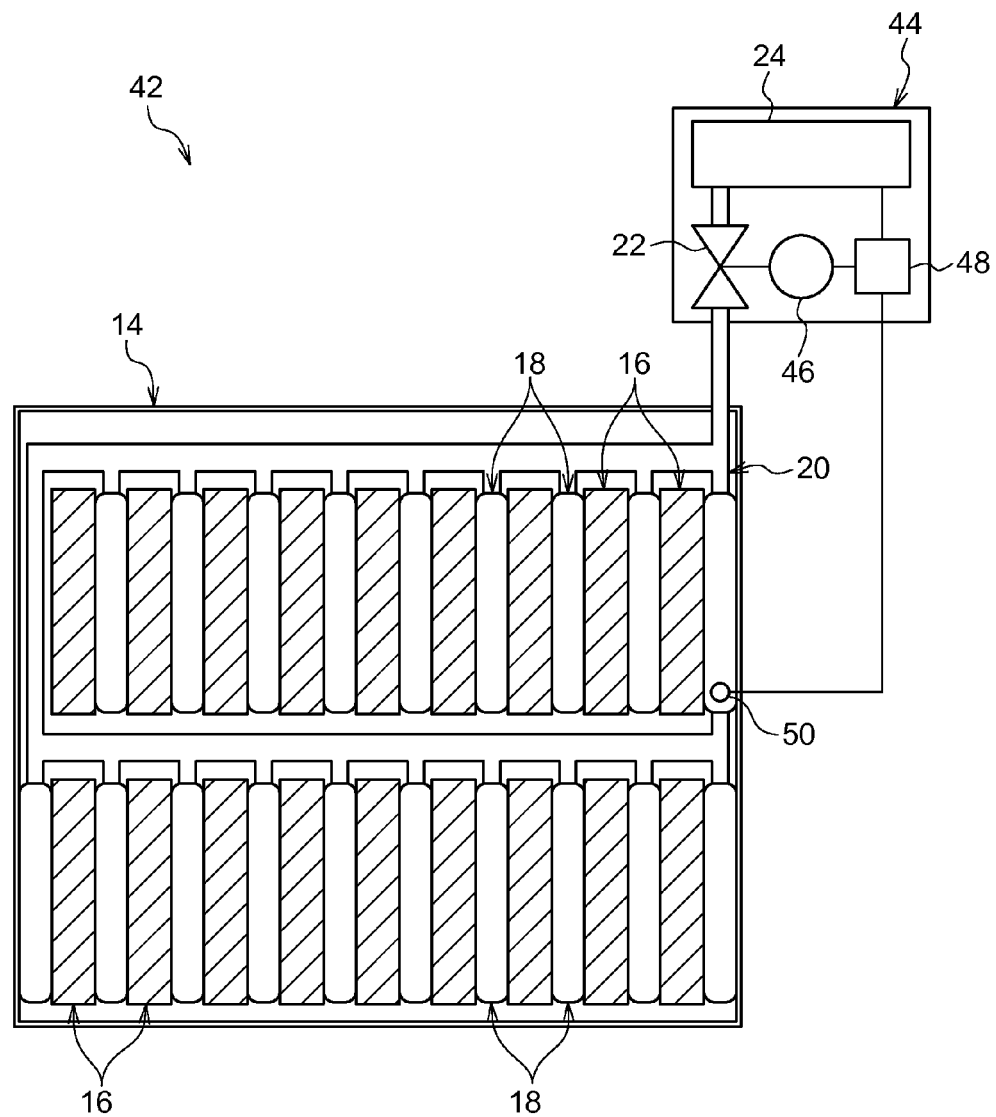
FIG. 8 is a plan view illustrating a storage apparatus of a third exemplary embodiment.
Figure 9:
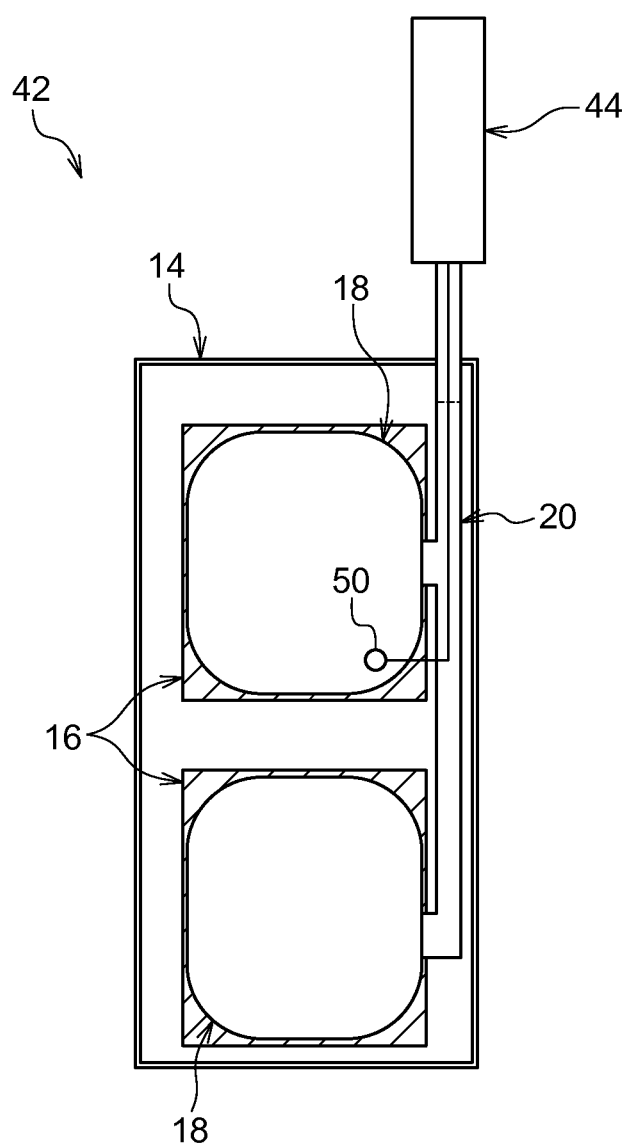
FIG. 9 is a side view illustrating a storage apparatus of the third exemplary embodiment.

As illustrated in FIG. 8 and FIG. 9, an internal pressure regulation device 44 is included in a storage apparatus 42 of the third exemplary embodiment, in place of the regulating valve 22 and the pressurizer 34 of the second exemplary embodiment. The internal pressure regulation device 44 is an example of an internal pressure regulator.

As is illustrated in detail in FIG. 8, the internal pressure regulation device 44 includes the pressurizer 24, a regulating valve 22, a solenoid actuator 46, and a controller 48. In the storage apparatus 42 of the third exemplary embodiment, an internal pressure sensor 50 that detects the internal pressure of the bags 18 is further provided to one or more of the bags 18 (one in the example of FIG. 8).

The controller 48 controls the pressurizer 24 and the solenoid actuator 46 based on the internal pressure detected by the internal pressure sensor 50. A plunger is moved by the solenoid actuator 46, and opening/closing of the regulating valve 22 is controlled. Namely, the third exemplary embodiment enables fluid to be charged into the bags 18 at a specific internal pressure, according to the internal pressure of the bags 18. Note that the controller 48 may also control the pressurizer 24 and the solenoid actuator 46 without controlling based on the internal pressure detected by the internal pressure sensor 50.

In the storage apparatus 42 of the third exemplary embodiment, the internal pressure of the bags 18 is regulated by the internal pressure regulation device 44 during manufacture such that the resonance frequencies FR of the hard disk devices 16 installed in the housing 14 are shifted away from the specific frequency ranges FS at which the data transfer rate of the hard disk device 16 deteriorates. This thereby enables deterioration caused by resonance to be suppressed in the data transfer rate in the hard disk devices 16 installed in the housing 14.

In particular, in the third exemplary embodiment, the internal pressure regulation device 44 regulates the internal pressure of the bags 18 based on the internal pressure of the bags 18 detected by the internal pressure sensor 50. This thereby enables, for example, re-regulation of the amount of fluid charged into the bags 18, namely the internal pressure of the bags 18, during usage of the storage apparatus 42, and this re-regulation can also be automated.

Explanation next follows regarding a fourth exemplary embodiment. In the fourth exemplary embodiment, components, members, and the like similar to those of the first to the third exemplary embodiments are appended with the same reference numerals and detailed explanation thereof is omitted.

Figure 10:
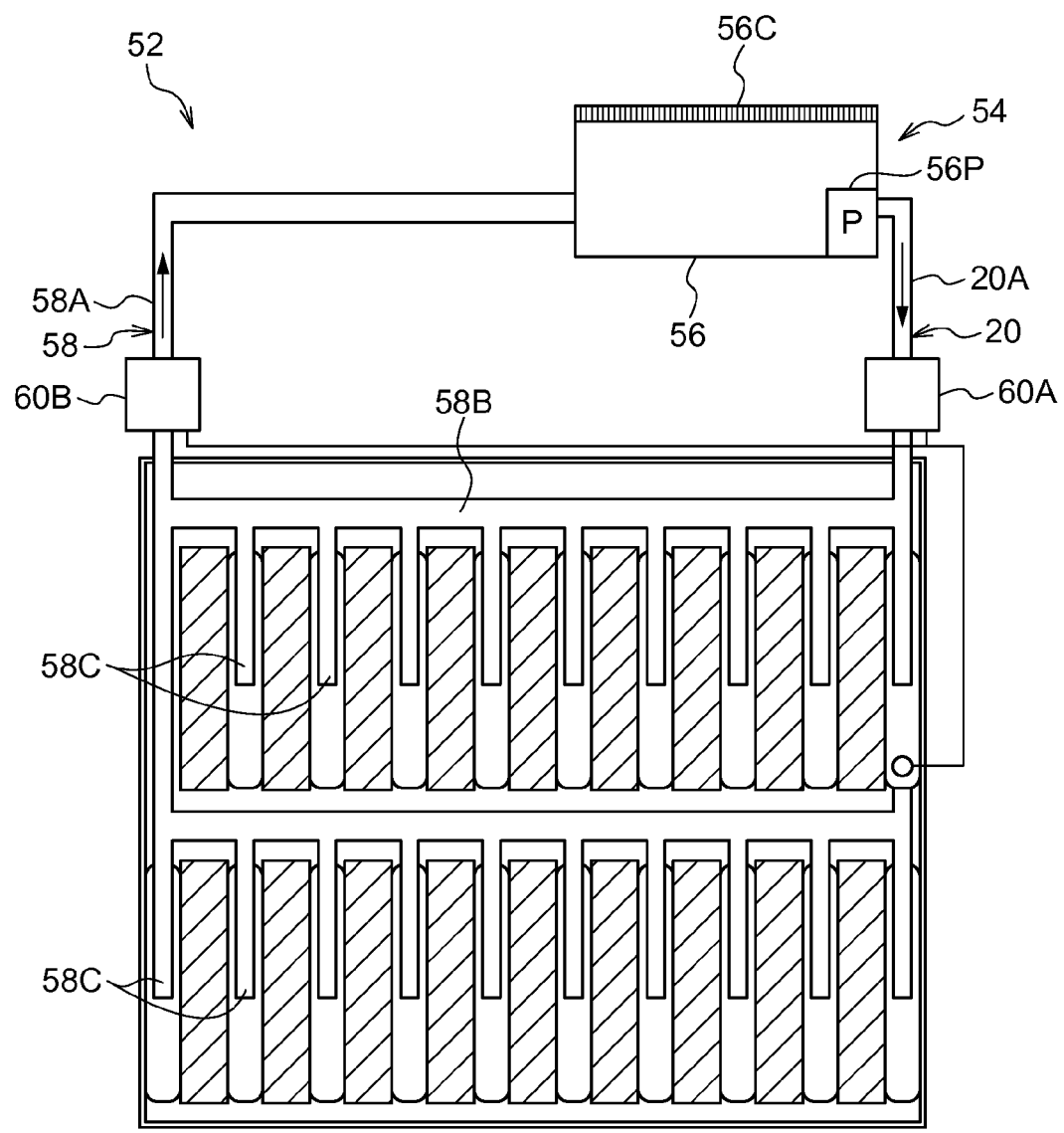
FIG. 10 is a plan view illustrating a storage apparatus of a fourth exemplary embodiment.
Figure 11:
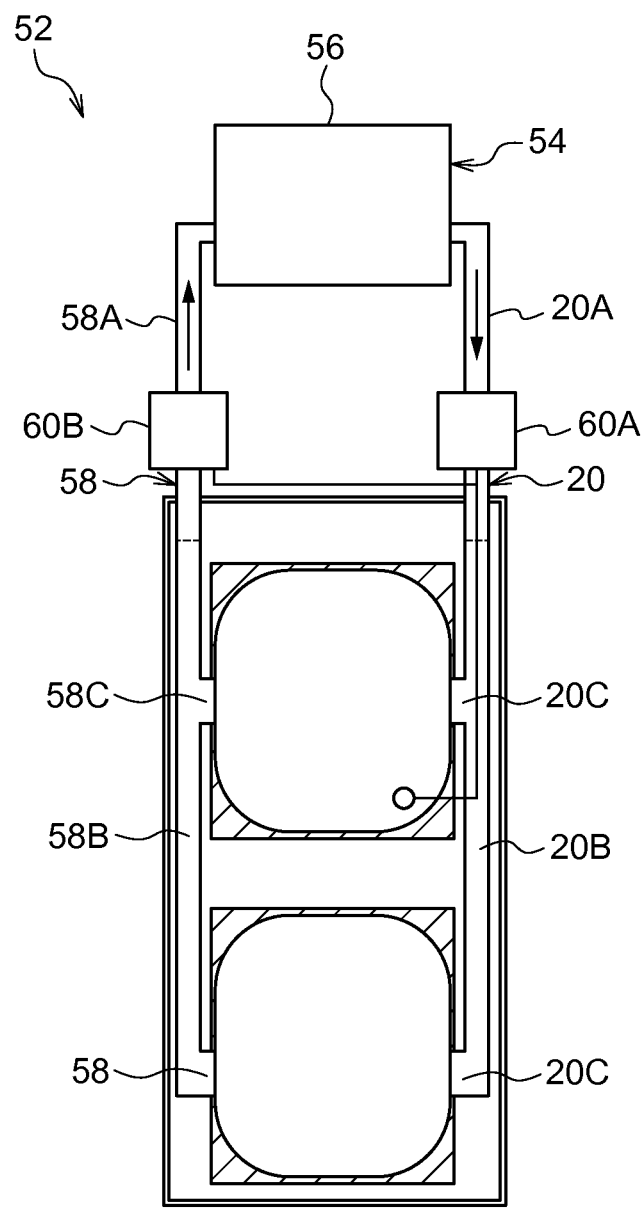
FIG. 11 is a side view illustrating a storage apparatus of the fourth exemplary embodiment.

As illustrated in FIG. 10 and FIG. 11, a fluid circulator 54 is included in a storage apparatus 52 of the fourth exemplary embodiment. The fluid circulator 54 includes a collector 56 that collects fluid internally, and pipes 20, 58.

An end portion of inflow pipe 20A is connected to the collector 56. The inflow pipe 20A is provided with an inflow regulator 60A. The inflow regulator 60A regulates the amount of fluid that flows into the bags 18 from the collector 56.

The collector 56 includes a cooling device 56C that cools the fluid, and a pump 56P that pressurizes the fluid. The cooling device 56C may, for example, be a heat transfer section that causes heat to be externally transferred by movement of a coolant, and may be a heat dissipater (such as a fin) that externally dissipates heat.

A pipe 58 is included in the fourth exemplary embodiment. As illustrated in FIG. 11, a pipe branch 58C is connected to each of the bags 18 at the opposite side to the side of the pipe branch 20C. The pipe branch 58C merges with a pipe branch 58B, and the pipe branch 58B merges with an outflow pipe 58A. An end portion of the outflow pipe 58A is connected to the collector 56 through an outflow regulator 60B. The outflow regulator 60B regulates the amount of fluid flowing out to the collector 56 from the interior of the bags 18. The inflow regulator 60A and the outflow regulator 60B are an example of an internal pressure regulator. Specifically, the inflow regulator 60A and the outflow regulator 60B may adopt a structure that includes a controller, a solenoid actuator, and a regulating valve, similarly to the internal pressure regulation device 44 of the third exemplary embodiment.

In the fourth exemplary embodiment, the pipes 20, 58 thus form a circulation flow path that allows fluid to circulate between the collector 56 and each of the plural bags 18. Regulation of the amount of fluid in the bags 18, and regulation of the internal pressure of the bags 18, are thereby enabled using the inflow regulator 60A and the outflow regulator 60B.

In the fourth exemplary embodiment, the internal pressure of the bag 18 is regulated by the inflow regulator 60A and the outflow regulator 60B during manufacture of the storage apparatus 52. The resonance frequencies FR of the hard disk devices 16 installed in the housing 14 are thereby shifted away from the specific frequency ranges FS of the hard disk device 16. This thereby enables deterioration caused by resonance in data transfer rate in the hard disk devices 16 installed in the housing 14 to be suppressed.

In the fourth exemplary embodiment also, regulation is enabled of the internal pressure of the bag 18 by the inflow regulator 60A and the outflow regulator 60B based on the internal pressure of the bag 18 detected by the internal pressure sensor 50. Automatic regulation is possible of the amount of fluid charged to the bags 18 (the internal pressure of the bags 18) during usage of the storage apparatus 52.

In the fourth exemplary embodiment, including the inflow regulator 60A and the outflow regulator 60B enables independent regulation of the fluid inflow to, and outflow from, the bags 18.

In the fourth exemplary embodiment, circulation of the fluid between the collector 56 and the bag 18 is enabled, while maintaining the internal pressure of each of the bags 18. When the fluid in the bags 18 absorb heat from the hard disk device 16, heat is transferred to the collector 56 and heat is dissipated by the collector 56 together with fluid circulation. Cooling of the hard disk device 16 is thereby enabled.

Explanation next follows regarding a fifth exemplary embodiment. In the fifth exemplary embodiment similar components, members, and the like to those of the first to the fourth exemplary embodiments are appended with the same reference numerals and detailed explanation thereof is omitted.

Figure 12:
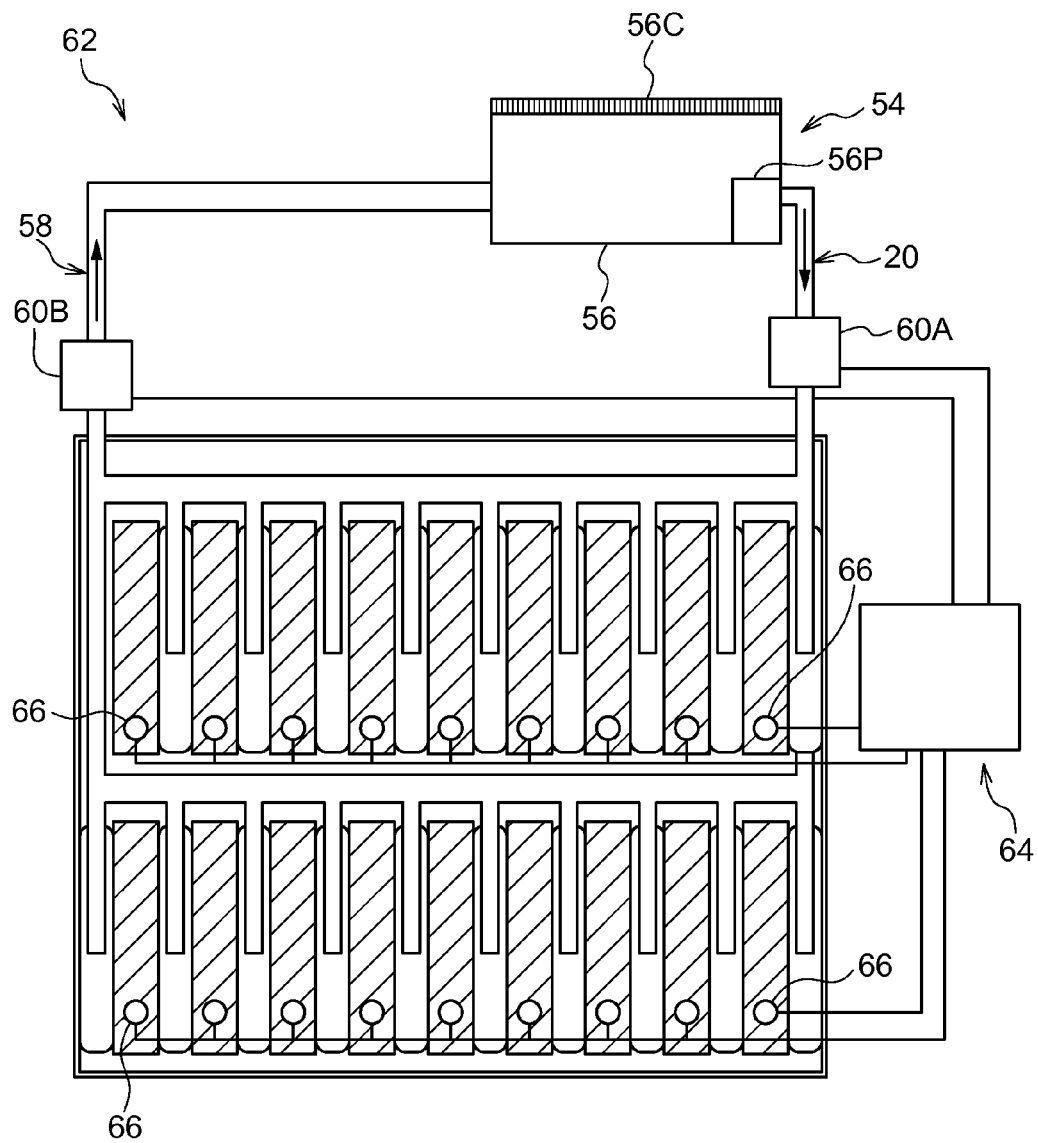
FIG. 12 is a plan view illustrating a storage apparatus of a fifth exemplary embodiment.
Figure 13:
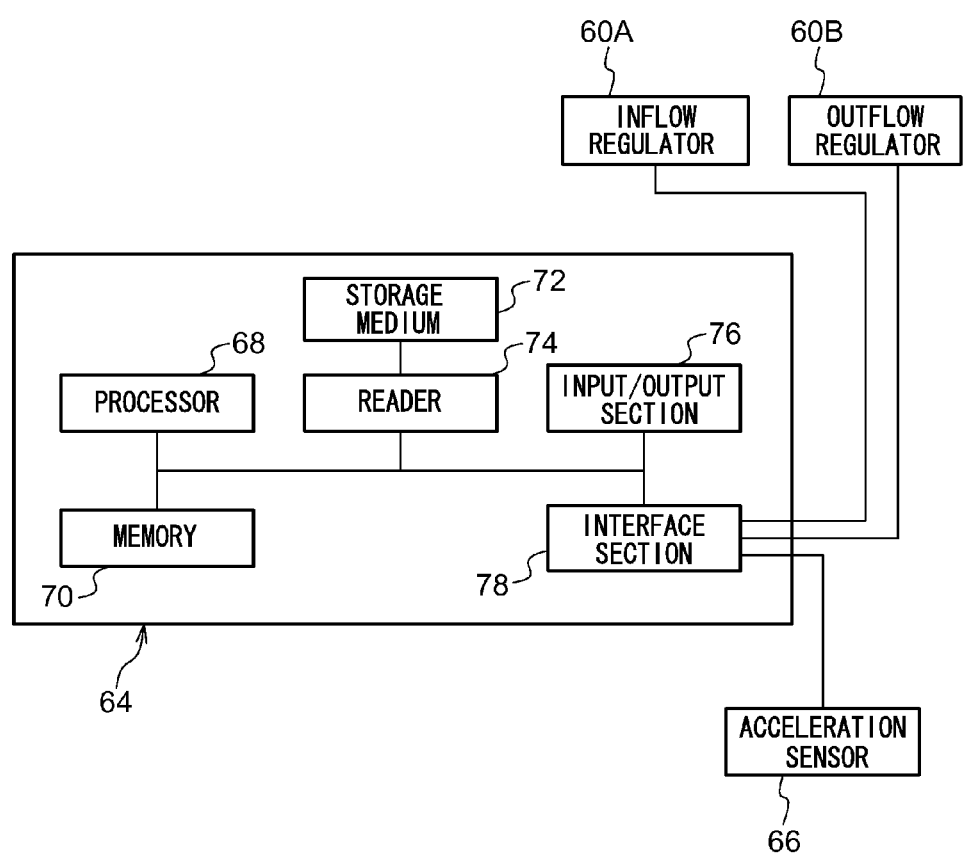
FIG. 13 is a block diagram of a controller of a storage apparatus of the fifth exemplary embodiment.

As illustrated in FIG. 12, a controller 64 and an acceleration sensor 66 are included in a storage apparatus 62 of the fifth exemplary embodiment. As illustrated in FIG. 13, the controller 64 includes a processor 68, memory 70, a reader 74, an input/output section 76, and an interface section 78 connected to one another by a bus. A storage medium 72 is further connected to the reader 74.

As is apparent from FIG. 12, acceleration sensors 66 are provided to each of the hard disk devices 16 in the fifth exemplary embodiment. The acceleration of vibration arising during operation of the hard disk devices 16 is detected by the acceleration sensors 66. This acceleration data is transmitted to the processor 68 through the interface section 78. The processor 68 reads a program and data stored in the storage medium 72 through the reader 74, expands these into the memory 70 as appropriate, and executes the program.

In the fifth exemplary embodiment, a program that controls the inflow regulator 60A and the outflow regulator 60B is stored in the storage medium 72. The program is a program that controls the inflow regulator 60A and the outflow regulator 60B such that for the specific frequency ranges FS of the hard disk device 16 (see FIG. 4), the resonance frequencies FR of the hard disk devices 16 are shifted away from the specific frequency ranges FS. The internal pressure of the bags 18 is regulated by the inflow regulator 60A and the outflow regulator 60B such that the resonance frequencies FR of the hard disk devices 16 installed in the housing 14 are shifted away from the specific frequency ranges FS by the processor 68 executing the program.

Figure 14:
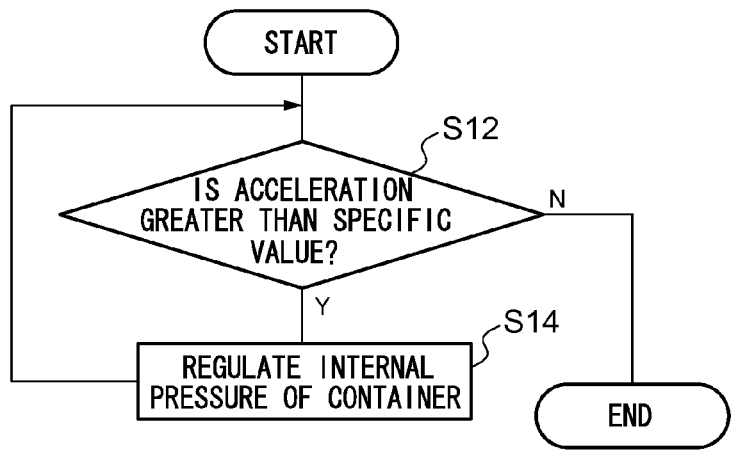
FIG. 14 is an example of a flowchart of internal pressure regulation control of a storage apparatus of the fifth exemplary embodiment.

A control flow that controls internal pressure in the bags 18 in the fifth exemplary embodiment is illustrated in FIG. 14.

In this control flow, first, determination is made at step S12 as to whether or not the acceleration of the hard disk device 16 detected by the acceleration sensor 66 is greater than a preset specific value. The "specific value" is, for example, a specific value from a case in which the data transfer rate of the hard disk device 16 deteriorates by 10% or more due to vibration of the hard disk device 16.

Processing ends in cases in which the acceleration of the hard disk device 16 is the specific value of lower. However, the internal pressure of the bags 18 is regulated at step S14 in cases in which the acceleration of the hard disk device 16 is greater than the specific value. Specifically, for example, the inflow regulator 60A is opened by a specific amount and the outflow regulator 60B is closed by a specific amount, and the internal pressure in the bags 18 is raised. Then, processing returns to step S12, and determination is again made as to whether or not the acceleration of the hard disk device 16 is greater than the specific value.

In the fifth exemplary embodiment, automating internal pressure regulation of the bags 18 and making the acceleration of the hard disk device 16 a specific value or less in this manner enables the resonance frequencies FR of the hard disk device 16 to be shifted away from the specific frequency ranges FS. The resonance frequencies FR of the hard disk devices 16 installed in the housing 14 are thereby shifted away from the specific frequency range FS of the hard disk device 16. This thereby enables deterioration due to resonance in the data transfer rate in the hard disk devices 16 installed in the housing 14 to be suppressed.

Figure 15:
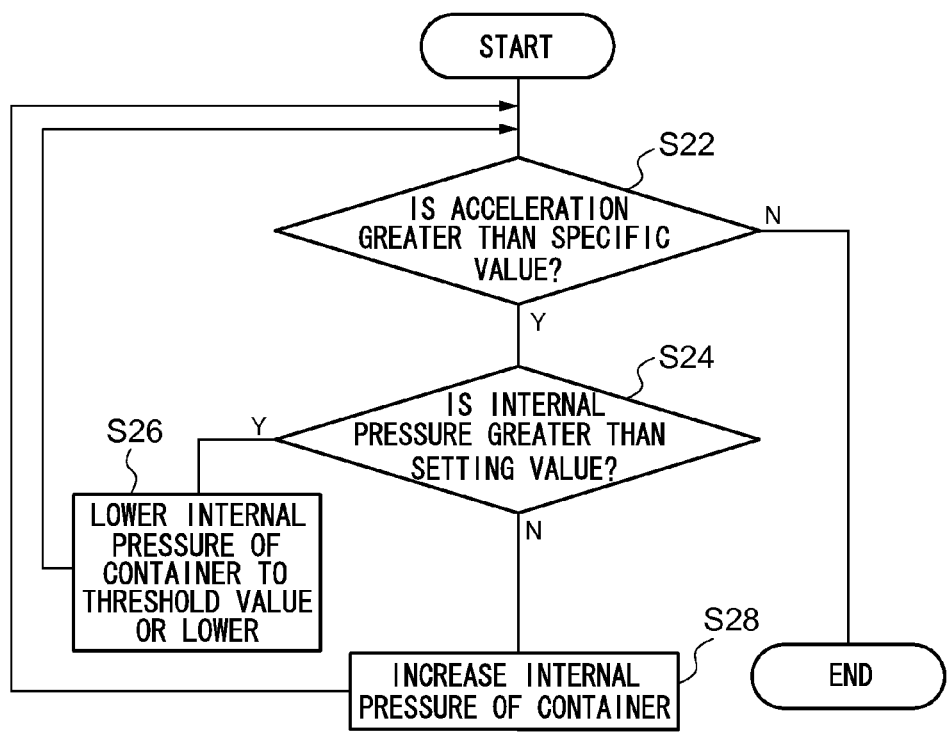
FIG. 15 is an example of a flowchart of internal pressure regulation control of a storage apparatus of the fifth exemplary embodiment.

In the fifth exemplary embodiment, the internal pressure sensor 50 that detects the internal pressure of the bags 18 may be provided, and control may be added that controls excessive increases in the internal pressure of the bags 18 similar to, for example, the control flow illustrated in FIG. 15.

In such a control flow, determination is made at step S22 as to whether or not the acceleration of the hard disk device 16 detected by the acceleration sensor 66 is greater than a specific value, and processing is ended in cases in which the acceleration is the specific value of lower. However, in cases in which the acceleration of the hard disk device 16 is greater than the specific value, determination is made at step S24 as to whether or not the internal pressure of the bags 18 is greater than a setting value. The "setting value" is, for example, a maximum value of the internal pressure set in order to maintain the durability of the bags 18. Although damage and the like does not occur immediately in the bags 18 even in cases in which the internal pressure of the bags 18 exceeds the setting value, in consideration of the bags 18 being in use for long periods, the internal pressure of the bags 18 preferably does not exceed the setting value.

In cases in which the internal pressure of the bags 18 is the setting value or less, the internal pressure of the bags 18 is raised at step S28. Processing then returns to step S22, and determination is remade as to whether or not the acceleration of the hard disk device 16 is greater than the specific value.

In cases in which the internal pressure of the bags 18 is determined at step S24 to be greater than the setting value, processing transitions to step S26, and the internal pressure of the bags 18 is dropped to a threshold value or less. The threshold value is a value smaller than the setting value, such that there is an ample amount of increase in the internal pressure of the bags 18 from the threshold to the setting value.

Processing then returns to step S22, and determination is remade as to whether or not the acceleration of the hard disk device 16 is greater than a specific value.

In this manner, in the control flow illustrated in FIG. 15, the internal pressure of the bags 18 is caused to decrease to the threshold value or less for some time in cases in which the internal pressure of the bags 18 is greater than the setting value. Subsequently the internal pressure of the bags 18 is caused to increase in order to make the acceleration of the bags 18 a specific value or less. Suppression of excessive increases (those exceeding the setting value) in the internal pressure of the bags 18 is thereby enabled, and the durability of the bags 18 is raised.

In the fifth exemplary embodiment a structure may be adopted in which a temperature sensor is provided to the hard disk device 16 interior. The controller 64 operates the pump 56P of the collector 56 based on the temperature of the hard disk device 16 detected by the temperature sensor. This thereby enables the fluid to be supplied into the bags 18 and the hard disk devices 16 to be cooled in cases in which the temperature of the hard disk device 16 has increased. Fluid that has absorbed heat from the hard disk device 16 is returned to the collector 56 where it dissipates heat. In the fifth exemplary embodiment, circulating the fluid between the hard disk device 16 and the collector 56 in this manner enables the hard disk device 16 to be continuously cooled. Further, an increase in power usage accompanying operation of the pump 56P is enabled by, for example, not making the fluid circulate in cases in which the temperature of the hard disk device 16 is not raised (is a specific temperature or less).

Explanation next follows regarding a sixth exemplary embodiment. In the sixth exemplary embodiment components, members, and the like similar to those of the first to the fifth exemplary embodiment are appended with the same reference numerals, and detailed explanation thereof is omitted.

Figure 16:
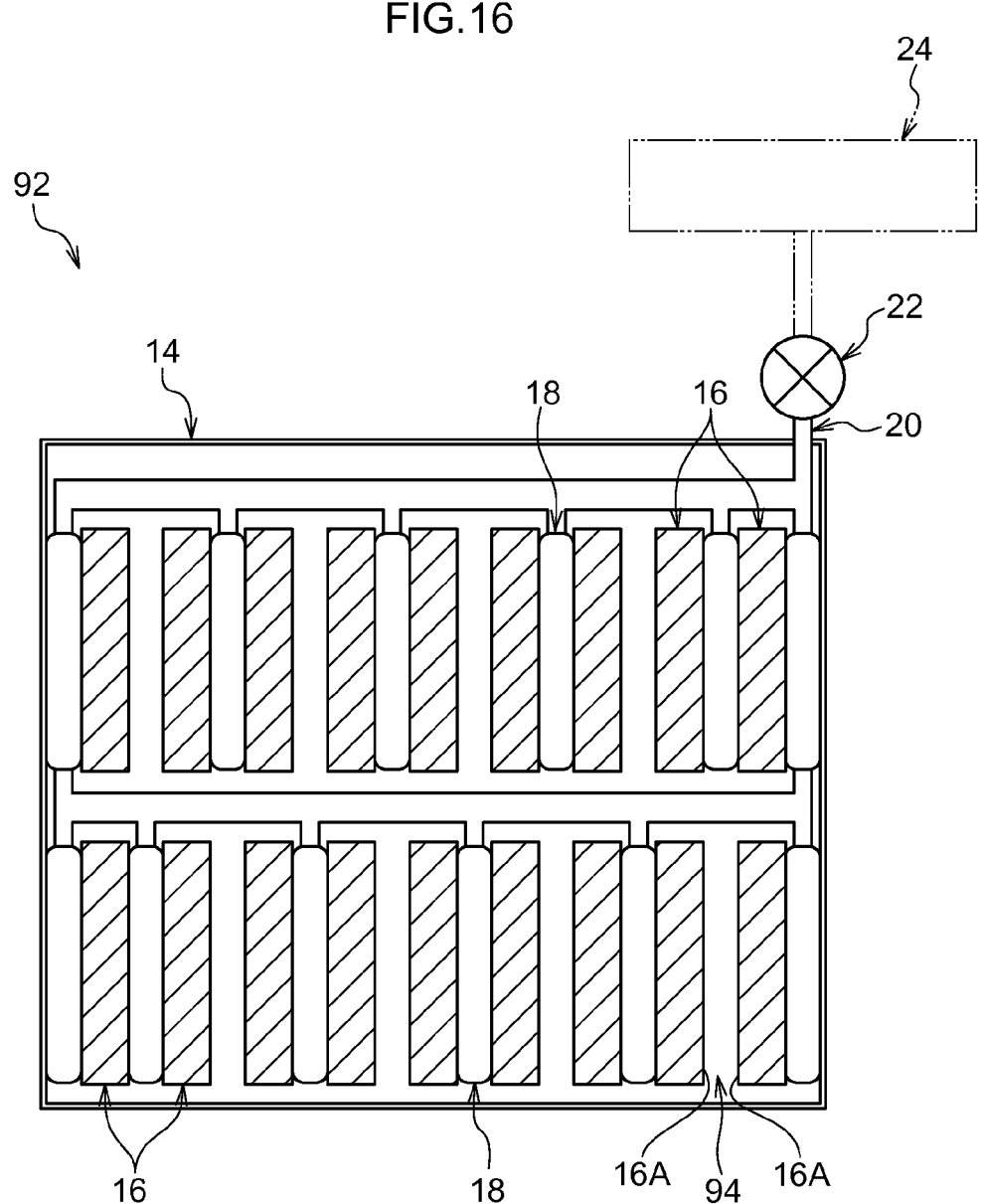
FIG. 16 is a plan view illustrating a storage apparatus of a sixth exemplary embodiment.

As illustrated in FIG. 16, in a storage apparatus 92 of the sixth exemplary embodiment, a structure is adopted in which the bags 18 are not disposed between some of the mutually facing planar surfaces 16A of the plural hard disk devices 16, such that a space 94 arises. Note that a structure may be adopted in which the space 94 is produced between the planar surface 16A and the side face 14S of the housing 14. However, the hard disk devices 16 are each in contact with at least one of the bags 18.

In the storage apparatus 92 of the sixth exemplary embodiment also, the internal pressure of the bags 18 is regulated by the regulating valve 22 during manufacture such that the resonance frequencies FR of the hard disk devices 16 installed in the housing 14 are shifted away from the specific frequency ranges FS at which the data transfer rate of the hard disk device 16 deteriorates. This thereby enables deterioration caused by resonance in the data transfer rate in the hard disk devices 16 installed in the housing 14 to be suppressed.

Note that although a regulating valve 22 is provided in the example illustrated in FIG. 16, similarly to in the structure of the first exemplary embodiment, the structures of each of the second to the fifth exemplary embodiment may be adopted for the internal pressure regulator that regulates the internal pressure in the bags 18.

Explanation next follows regarding a seventh exemplary embodiment. In the seventh exemplary embodiment similar components, members, and the like to those of the first to the sixth exemplary embodiment are appended with the same reference numerals, and detailed explanation thereof is omitted.

Figure 17:
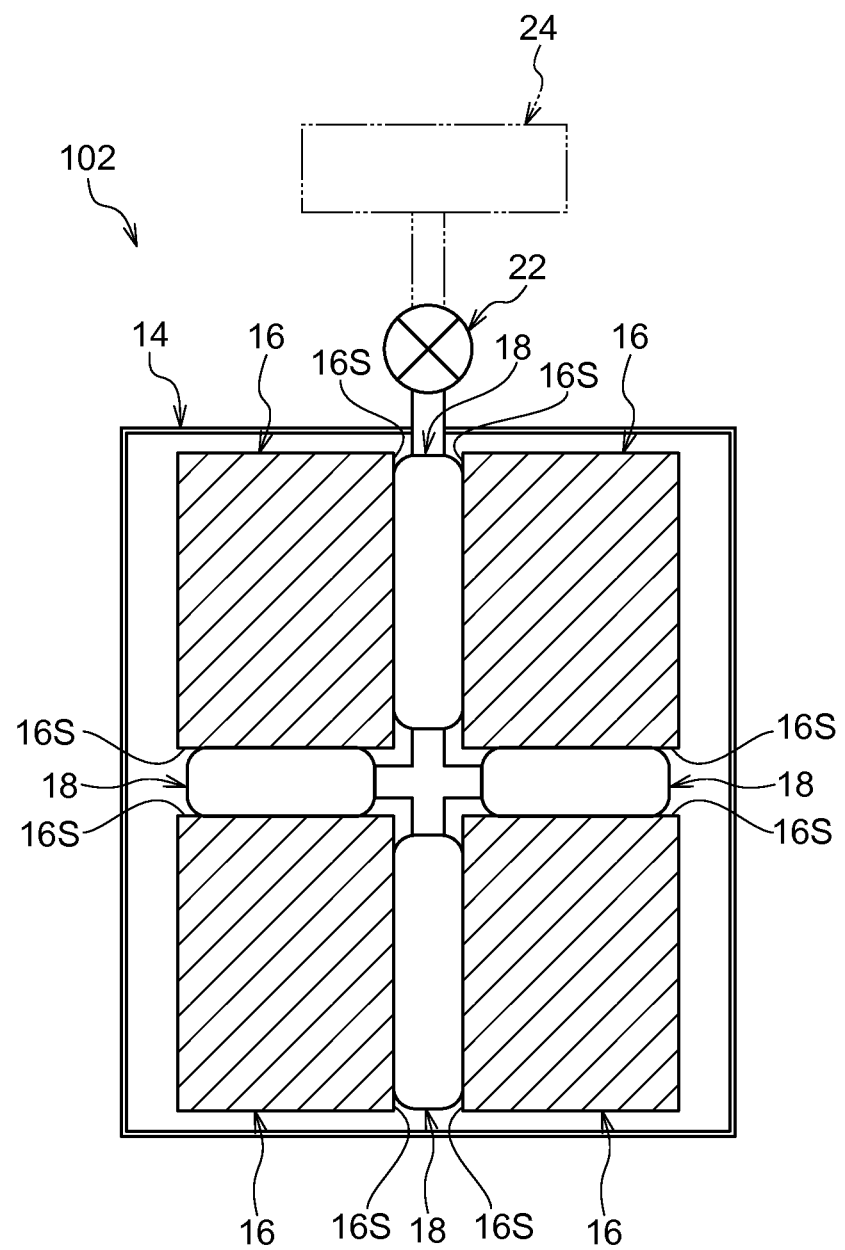
FIG. 17 is a plan view illustrating a storage apparatus of a seventh exemplary embodiment.

In a storage apparatus 102 of the seventh exemplary embodiment, the plural hard disk devices 16 are arrayed in the housing 14 so as to face toward side surfaces 16S as illustrated in FIG. 17. In the example illustrated in FIG. 17, a total of four of the hard disk devices 16 are arrayed in two rows in the X direction and two rows in the Y direction.

The bags 18 are then disposed between the side faces 14S of the hard disk devices 16, and the bags 18 are in contact with the side faces 14S.

In the storage apparatus 102 of the seventh exemplary embodiment also, the internal pressure of the bags 18 is regulated by the regulating valve 22 during manufacture. The resonance frequencies FR of the hard disk devices 16 installed in the housing 14 are then shifted away from the specific frequency ranges FS at which the data transfer rate of the hard disk device 16 deteriorates. This thereby enables deterioration due to resonance in the data transfer rate of the hard disk devices 16 installed in the housing 14 to be suppressed.

Note that although a structure is adopted in the example illustrated in FIG. 17 in which the regulating valve 22 is provided similarly to in the first exemplary embodiment, a structure of the second to the fifth exemplary embodiment may be adopted for the internal pressure regulator that regulates the internal pressure in the bags 18.

In each of the above exemplary embodiments, the fluid supplied into the bags 18 may be either a gas or a liquid. Air, hydrogen gas, helium, or the like may be employed as the gas. Water, oil, or the like may be employed as the liquid.

Note that a substance having a high thermal conductivity is preferably employed as the fluid in a structure that, for example, cools the hard disk device 16 using the fluid, as in for example the fourth exemplary embodiment and the fifth exemplary embodiment. For example, the above liquids (water, oil, and the like) have higher thermal conductivity compared to the gases, and are therefore preferable from the point of view of effectively cooling the hard disk device 16. Moreover, even for the gases for example, although the thermal conductivity of air is approximately 0.02 W/(m·K), the thermal conductivity of hydrogen gas, at approximately 0.2 W/(m·K), and the thermal conductivity of helium gas, at approximately 0.15 W/(m·K), are high in comparison. Hydrogen gas and helium gas are therefore preferably employed as the gas for the fluid from the point of view of effectively cooling the hard disk device 16. Obviously, structures that employ air are not precluded.

Explanation next follows regarding an eighth exemplary embodiment. In the eighth exemplary embodiment components, members, and the like similar to those of the first to the seventh exemplary embodiment are appended with the same reference numerals, and detailed explanation thereof is omitted.

Figure 18:
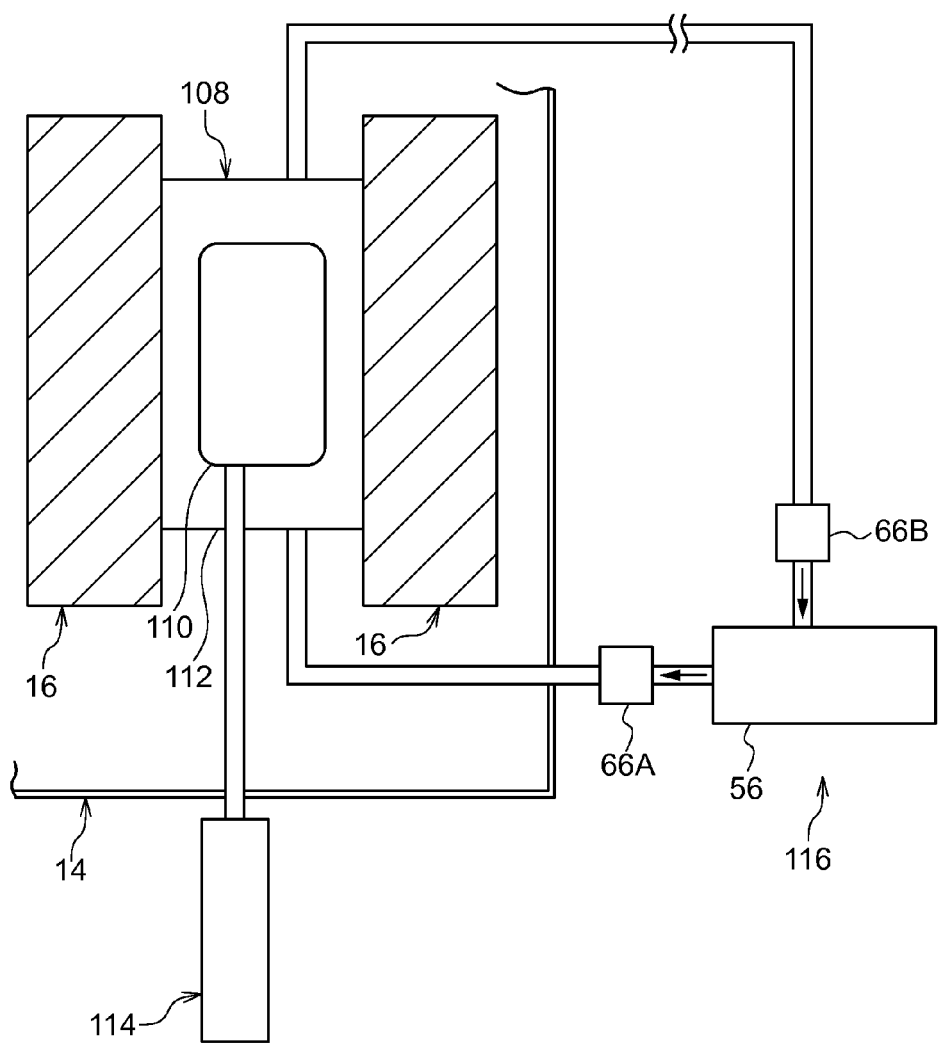
FIG. 18 is a plan view illustrating a bag of an eighth exemplary embodiment.

As illustrated in FIG. 18, a bag 108 of the eighth exemplary embodiment has a double-wall structure including an inner gas charged section 110, and an outer liquid charged section 112. A gas supply device 114 is connected to the gas charged section 110, and a liquid circulation device 116 is connected to the liquid charged section 112. Suppression of deformation and vibration at the resonance frequencies of the hard disk device 16 is then performed by regulating the amount of gas supplied to the gas charged section 110 by the gas supply device 114. The gas supply device 114 is an example of an internal pressure regulator, and for example, may be applied to the regulating valve 22, the internal pressure regulation device 44, and the like.

Effective cooling of the hard disk device 16 is enabled by causing the liquid to circulate between the liquid circulation device 116 and the liquid charged section 112. For example, a structure similar to that of the fluid circulator 54 illustrated in FIG. 10 may be adopted for the liquid circulation device 116.

In the eighth exemplary embodiment, for example, air, hydrogen gas, helium gas, or the like may be employed as the gas charged in the gas charged section 110. For example, water, oil, or the like may be employed as the liquid charged into the liquid charged section 112.

The eighth exemplary embodiment the bag 108 is double-wall structure including the internal gas charged section 110, and the external liquid charged section 112. This thereby enables, for example, a function regulating the internal pressure of the bag 108 by regulating the amount of gas of the gas charged section 110, and a function of cooling by circulation of the liquid to the liquid charged section 112, to both be exhibited independently.

Substances that are durable with respect to the internal pressure of the internal fluid, and that are soft (flexible) so as to adhere closely to the hard disk device 16 in accordance with the internal pressure (amount) of the liquid are suitable as the substance of the bag in each of the above exemplary embodiments.

In addition to rubbers, materials of rubber compounded with single layer carbon nanotubes or carbon fiber may be employed as the specific substance of the bags 18, 108. In particular, heat dissipating silicon rubber has higher thermal conductivity than organic rubbers, and is therefore a preferable material for the bags 18 and the liquid charged section 112 from the point of view of effectively cooling the hard disk device 16.

The storage devices disposed (installed) in the housing 14 is not limited to the hard disk devices 16. For example, magnetic disk devices other than hard disk devices (devices that perform data writing and reading while spinning a magnetic disk such as flexible disk) may be used. Devices that perform data writing and reading while spinning an optical disk may also be used.

Although, examples have been given above in which the number of storage devices in the housing 14 is plural, a single storage device may be employed. In a structure in which a single storage device is installed in the housing 14, it is sufficient for the bags 18 charged with the internal fluid to be in contact with the storage device.

Although the shape of the storage devices is not particularly limited, in storage devices that include the planar surface 16A, like the hard disk device 16 above for example, causing the bag 18 to contact the planar surface 16A enables a wide contact area to be secured. Moreover, in the hard disk device 16, the structure is often such that the direction in which the magnetic disk and the head face each other is the thickness direction of the hard disk device 16, and vibration in this facing direction is effectively suppressed by causing the bag 18 to contact the planar surface 16A.

In a structure in which plural storage devices having planar surfaces are installed in the housing 14, the disposition of the storage devices is highly efficient when the storage devices are installed such that the planar surfaces thereof face one another. Since causing one of the bags 18 to contact two of the storage devices is enabled when plural of the bags 18 are disposed in spaces between the plural storages devices, the number of bags 18 is low in comparison to structures in which the bags 18 contact the storage devices one-to-one.

Explanation has been given regarding exemplary embodiments of technology disclosed herein, however the technology disclosed herein is not limited thereto, and it goes without saying that various modifications may be implemented within a range not departing from the spirit of the technology disclosed herein.

Technology disclosed herein enables performance deterioration due to resonance of a storage device to be suppressed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

All cited documents, patent applications and technical standards mentioned in the present specification are incorporated by reference in the present specification to the same extent as if the individual cited document, patent application, or technical standard was specifically and individually indicated to be incorporated by reference patent application, or technical standard was specifically and individually indicated to be incorporated by reference.

What is claimed is:

1. A storage apparatus, comprising:
   one or a plurality of storage devices installed in a housing;
   a bag that is internally charged with a fluid and that contacts the one or a plurality of storage devices; and
   an internal pressure regulator that regulates the internal pressure of the bag.

2. The storage apparatus of claim 1, wherein the one or a plurality of storage devices include a planar surface, and the bag is disposed in contact with the planar surface.

3. The storage apparatus of claim 2, including a plurality of the storage devices disposed such that the planar surfaces thereof oppose each other across a space, wherein the bag is disposed in the space and in contact with each of the opposing planar surfaces.

4. The storage apparatus of claim 1, wherein the internal pressure regulator includes an open/close valve that changes a communication state between the interior and the exterior of the bag.

5. The storage apparatus of claim 1, wherein the internal pressure regulator includes:
an inflow regulator that regulates inflow of the fluid to the bag interior; and
an outflow regulator that regulates outflow of the fluid from the bag interior.

6. The storage apparatus of claim 5, further comprising a fluid circulation device that circulates the fluid between the interior and exterior of the bag.

7. The storage apparatus of claim 6, further comprising a cooling device that cools the fluid flowing into the bag.

8. The storage apparatus of claim 5, further comprising:
an acceleration sensor that detects acceleration of the storage device; and
a controller that controls the inflow regulator and the outflow regulator based on the acceleration detected by the acceleration sensor.

9. The storage apparatus of claim 1, wherein the bag further comprises:
a liquid charged section charged with a liquid; and
a gas charged section disposed inside the liquid charged section and charged with a gas.

10. The storage apparatus of claim 9, wherein the internal pressure regulator regulates the internal pressure of the gas of the gas charged section.

11. A storage apparatus manufacturing method, comprising:
installing one or a plurality of storage devices, and a bag that contacts the one or a plurality of storage devices, inside a housing; and
regulating the internal pressure of the bag by regulating an amount of fluid in the bag interior, and shifting a resonance frequency of the one or a plurality of storage devices in contact with the bag away from a frequency at which the performance of the one or a plurality of storage devices deteriorates.

12. A storage apparatus measurement method, comprising:
vibrating a storage device and measuring a specific frequency at which the performance of the storage device deteriorates; and
vibrating the storage device in an installed state in a housing and measuring the resonance frequency of the storage device; and
comparing the specific frequency to the resonance frequency.

* * * * *